United States Patent
Ito et al.

(10) Patent No.: US 7,540,725 B2
(45) Date of Patent: Jun. 2, 2009

(54) SEAL MECHANISM FOR FLUID MACHINE

(75) Inventors: Shoji Ito, Tokyo (JP); Junya Kawabata, Tokyo (JP)

(73) Assignee: Ebara Corporation, Tokyo (JP)

( * ) Notice: Subject to any disclaimer, the term of this patent is extended or adjusted under 35 U.S.C. 154(b) by 577 days.

(21) Appl. No.: 10/561,367

(22) PCT Filed: Nov. 12, 2004

(86) PCT No.: PCT/JP2004/017228

§ 371 (c)(1),
(2), (4) Date: Dec. 20, 2005

(87) PCT Pub. No.: WO2005/061932

PCT Pub. Date: Jul. 7, 2005

(65) Prior Publication Data

US 2006/0147328 A1    Jul. 6, 2006

(30) Foreign Application Priority Data

Dec. 22, 2003  (JP) ............................. 2003-425455
Mar. 16, 2004  (JP) ............................. 2004-074828

(51) Int. Cl.
    *F04B 35/04* (2006.01)
(52) U.S. Cl. ................... 417/423.1; 415/172.1
(58) Field of Classification Search ............... 417/413.1, 417/423.1; 415/172.1, 173.1, 173.3
    See application file for complete search history.

(56) References Cited

U.S. PATENT DOCUMENTS 4,643,639 A    2/1987  Caine 6,082,964 A    7/2000  Kuroiwa
6,540,231 B1   4/2003  Trantow et al.
2001/0038179 A1  11/2001  Ikeda et al.

FOREIGN PATENT DOCUMENTS

| DE | 1 937 418 | 2/1971 |
|---|---|---|
| EP | 0 039 435 A1 | 11/1981 |
| EP | 0 167 837 A1 | 1/1986 |
| EP | 0 905 381 A1 | 3/1999 |
| EP | 1 130 294 A2 | 9/2001 |
| EP | 1 134 465 A2 | 9/2001 |

*Primary Examiner*—Michael Cuff
*Assistant Examiner*—Vikansha S Dwivedi
(74) *Attorney, Agent, or Firm*—Wenderoth, Lind & Ponack, L.L.P.

(57) ABSTRACT

A seal mechanism (10) can reduce noise during operation. The seal mechanism (10) is used for a fluid machine (P) to prevent a fluid from leaking out of a high-pressure space (H) into a low-pressure space (L) in the fluid machine (P). The seal mechanism (10) has an annular seal member (12) movable in a radial direction and a housing (11) disposed between a body (23) of the fluid machine (P) and a rotatable member (22) located inside the body (23) of the fluid machine (P) so as to receive the annular seal member (12). The annular seal member (12) has a first surface (12a) on a side of the low-pressure space (L) in the fluid machine (P). The housing (11) has a second surface (11c) facing the first surface (12a) of the annular seal member (12). The seal mechanism (10) has one or more passages (15) formed in the first surface (12a) and/or the second surface (11c).

20 Claims, 10 Drawing Sheets

SEAL MECHANISM FOR FLUID MACHINE

TECHNICAL FIELD

The present invention relates to a seal mechanism for a fluid machine, and more particularly to a seal mechanism for preventing a fluid from leaking out of a high-pressure space into a low-pressure space between a body and a rotatable member of a fluid machine. The present invention also relates to a fluid machine having such a seal mechanism, and more particularly to a centrifugal pump having such a seal mechanism.

BACKGROUND ART

Generally, fluid machines have a seal mechanism for preventing a fluid from leaking out of a high-pressure space into a low-pressure space. For example, a centrifugal pump, which typifies fluid machines, has a seal mechanism for sealing a liquid at a mouth ring of an impeller and at a portion through which a main shaft or a shaft sleeve penetrates a body of the centrifugal pump. FIGS. 1 through 3 show an arrangement of a conventional seal mechanism. FIG. 1 is a plan view of a conventional seal mechanism 100, FIG. 2 is a cross-sectional view taken along line II-II of FIG. 1, and FIG. 3 is a cross-sectional view showing the conventional seal mechanism 100 together with an impeller 110 of a centrifugal pump.

As shown in FIG. 2, the conventional seal mechanism 100 includes a housing (or casing) 101 and a liner ring 102 received in the housing 101. As shown in FIGS. 1 and 2, the liner ring 102 has a plurality of notches 103 formed at equal intervals in a circumferential direction on a peripheral portion of the liner ring 102. In the example shown in FIG. 1, the liner ring 102 has three notches 103. The housing 101 has bent portions 104 formed on an inner circumferential portion of the housing 101. The bent portions 104 engage with the notches 103 of the liner ring 102 and serve as stoppers to prevent the liner ring 102 from being rotated.

The housing 101 has an inside diameter $D_1$ larger than an outside diameter $D_2$ of the liner ring 102 ($D_1 > D_2$). Thus, the liner ring 102 is movable in a radial direction by a difference ($D_1 - D_2$) between the inside diameter $D_1$ of the housing 101 and the outside diameter $D_2$ of the liner ring 102. The liner ring 102 is also movable in a circumferential direction by a difference between the width of the notches 103 and the width of the bent portions 104.

In the centrifugal pump shown in FIG. 3, the conventional seal mechanism 100 is attached to a body 111 of the centrifugal pump so that the housing 101 of the seal mechanism 100 is fitted into an innermost portion of the body 111 near the impeller 110. The impeller 110 is rotatable about an axis 112 as shown by arrow B. Accordingly, a handled liquid flows inside the impeller 110 as shown by arrows C. Thus, the centrifugal pump produces a space L having a low pressure below the housing 101 of the seal mechanism 100 and a space H having a high pressure above the housing 101 of the seal mechanism 100.

With the conventional seal mechanism 100, when the impeller 110 is rotated, it has previously been thought that a clearance δ (see FIG. 2) between an upper surface 101a of a bottom of the housing 101 and a lower surface 102a of the liner ring 102 becomes zero because the liner ring 102 is pressed against the housing 101. However, the clearance δ does not become zero in practical use because the handled liquid flows between inner surfaces of the housing 101 and outer surfaces of the liner ring 102 as shown by arrows E in FIG. 2. Thus, the liner ring 102 plays within the housing 101 together with the impeller 110, thereby causing noise to be generated.

As described above, when the impeller 110 is rotated, the bent portions 104 of the housing 101 engage as stoppers with the notches 103 of the liner ring 102 so as to prevent the liner ring 102 from being rotated together with the impeller 110 due to sliding contact between the liner ring 102 and the impeller 110, the viscosity of the handled liquid present between the liner ring 102 and the impeller 110, and other possible factors. Thus, if the liner ring 102 moves together with the impeller 110, the liner ring 102 hits the bent portions 104 thereby generating noise.

DISCLOSURE OF INVENTION

The present invention has been made in view of the above drawbacks. It is, therefore, a first object of the present invention to provide a seal mechanism for a fluid machine which can reduce noise caused by an annular seal member.

A second object of the present invention is to provide a fluid machine, particularly a centrifugal pump, having a seal mechanism for a fluid machine which can reduce noise caused by an annular seal member of a seal mechanism.

According to a first aspect of the present invention, there is provided a seal mechanism capable of reducing noise. The seal mechanism is used for a fluid machine to prevent a fluid from leaking out of a high-pressure space into a low-pressure space in the fluid machine. The seal mechanism has an annular seal member movable in a radial direction and a housing disposed between a body of the fluid machine and a rotatable member located inside the body of the fluid machine so as to receive the annular seal member. The annular seal member has a first surface on a side of the low-pressure space in the fluid machine. The housing has a second surface facing the first surface of the annular seal member. The seal mechanism has at least one passage formed in the first surface and/or the second surface.

Since the seal mechanism has one or more passages formed in the first surface and/or the second surface, a fluid present in a clearance between the seal member and the housing flows through the passages into the low-pressure space. Specifically, when a fluid machine is operated, a negative pressure of the low-pressure space is introduced into the passages so that the seal member is brought into close contact with the housing. Thus, the seal member is prevented from moving in the housing. Accordingly, it is possible to prevent noise from being generated. Further, since the seal member is brought into close contact with the housing, the apparent stiffness of the seal mechanism can be improved so that the seal member is not substantially deformed. Thus, it is possible to prevent noise from being generated due to deformation of the seal member.

The first surface and/or the second surface may be formed by a flat surface. The seal mechanism may have a plurality of passages that do not reach an outer circumferential surface of the annular seal member. Further, the seal mechanism may have a plurality of passages that reach neither an outer circumferential surface of the annular seal member nor an inner circumferential surface of the annular seal member. The passages may include radially arranged passages or a passage extending in a circumferential direction.

The housing and/or the seal member may be made of metal or synthetic resin. The housing and/or the seal member may include a core covered with synthetic resin. The housing and/or the seal member may be formed by molding.

According to a second aspect of the present invention, there is provided a seal mechanism capable of reducing noise. The seal mechanism is used for a fluid machine to prevent a fluid from leaking out of a high-pressure space into a low-pressure space in the fluid machine. The seal mechanism has an annular seal member movable in a radial direction and a housing disposed between a body of the fluid machine and a rotatable member located inside the body of the fluid machine so as to receive the annular seal member. The annular seal member has at least two first surfaces on a side of the low-pressure space in the fluid machine. The housing has a second surface facing the first surfaces of the annular seal member. The two first surfaces of the annular seal member include a radially outward surface and a radially inward surface located radially inward of the radially outward surface. The radially outward surface is brought into contact with the second surface of the housing over its entire surface. The radially outward surface projects from the radially inward surface toward the low-pressure space in the fluid machine.

Since the radially outward surface projects from the radially inward surface toward the low-pressure space in the fluid machine, only the radially outward surface is continuously brought into contact with the second surface of the housing when the fluid machine is operated. Thus, only the radially outward surface is worn away. As a result, the radially inward surface does not project from the radially outward surface toward the low-pressure space unless the radially outward surface becomes in the same plane as the radially inward surface due to abrasion of the radially outward surface. Accordingly, the movement of the seal member is not restricted by the housing, and it is possible to prevent noise from being generated.

According to a third aspect of the present invention, there is provided a centrifugal pump capable of reducing noise. The centrifugal pump has a body, a rotatable shaft, an impeller rotatable about the rotatable shaft within the body, and the aforementioned seal mechanism. The seal mechanism is disposed between the body and the impeller. Since the seal mechanism is disposed between the body and the impeller, the centrifugal pump does not generate noise caused by the seal mechanism during operation.

According to a fourth aspect of the present invention, there is provided a centrifugal pump capable of reducing noise. The centrifugal pump has a body, a rotatable shaft, an impeller rotatable about the rotatable shaft within the body, and the aforementioned seal mechanism. The seal mechanism is disposed between the body and the rotatable shaft. Since the seal mechanism is disposed between the body and the rotatable shaft, the centrifugal pump does not generate noise caused by the seal mechanism during operation.

According to a fifth aspect of the present invention, there is provided a fluid machine capable of reducing noise. The fluid machine has a body, a rotatable member disposed within the body, and the aforementioned seal mechanism. The seal mechanism is disposed between the body and the rotatable member. Since the seal mechanism is disposed between the body and the rotatable member, the fluid machine does not generate noise caused by the seal mechanism during operation.

The above and other objects, features, and advantages of the present invention will be apparent from the following description when taken in conjunction with the accompanying drawings which illustrate preferred embodiments of the present invention by way of example.

BEST MODE FOR CARRYING OUT THE INVENTION

Figure 1:
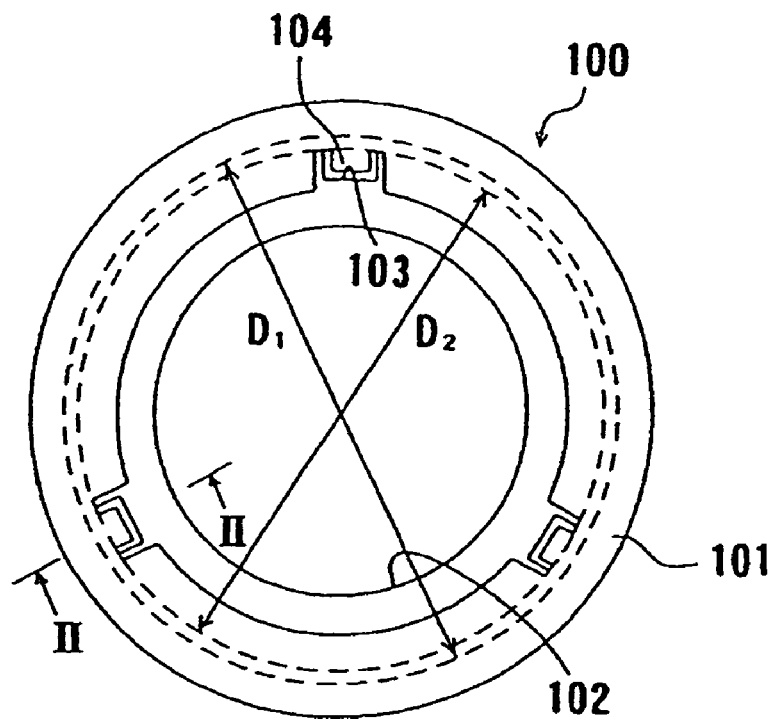
FIG. 1 is a plan view showing a conventional seal mechanism.
Figure 2:
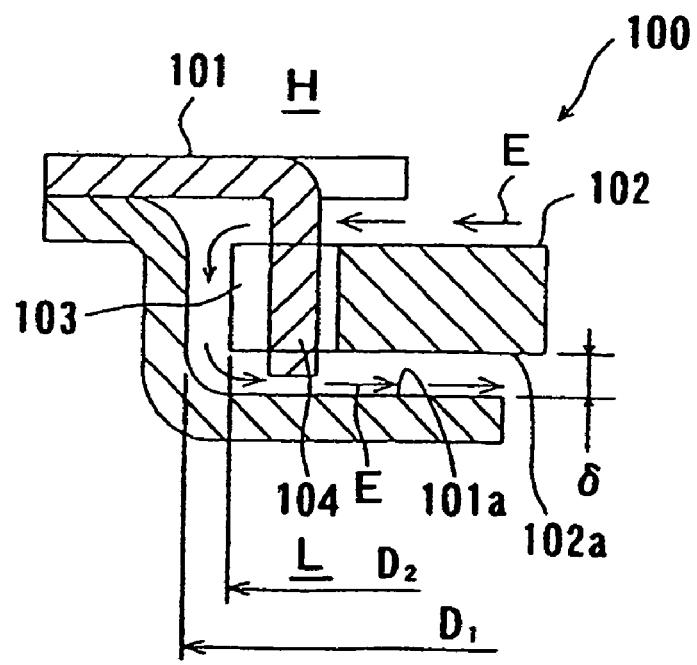
FIG. 2 is a cross-sectional view taken along line II-II of FIG. 1.

A seal mechanism for a fluid machine according to embodiments of the present invention will be described below with reference to FIGS. 4 through 17. Like or corresponding parts are denoted by like or corresponding reference numerals throughout drawings, and will not be described below repetitively.

Figure 4:
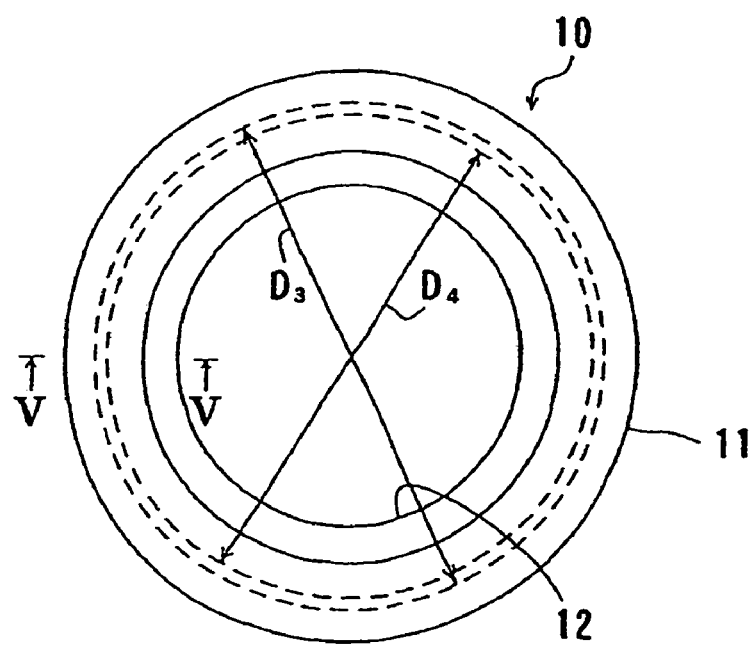
FIG. 4 is a plan view showing a seal mechanism according to a first embodiment of the present invention.
Figure 5:
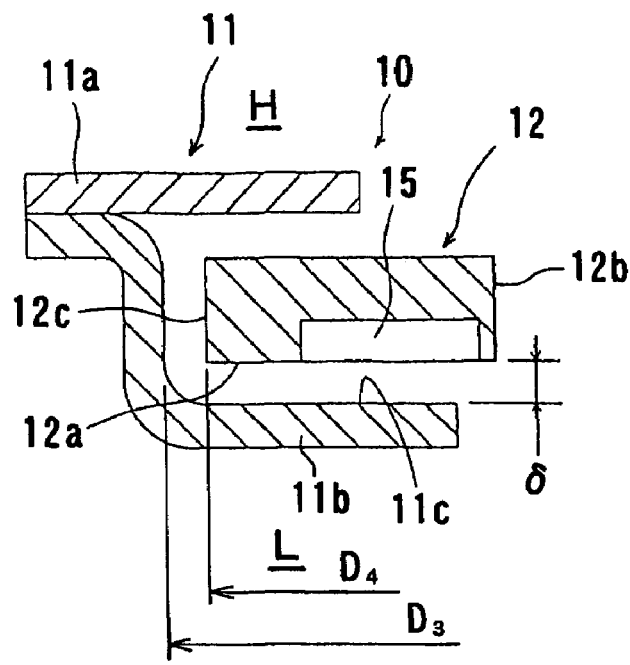
FIG. 5 is a cross-sectional view taken along line V-V of FIG. 4.
Figure 6:
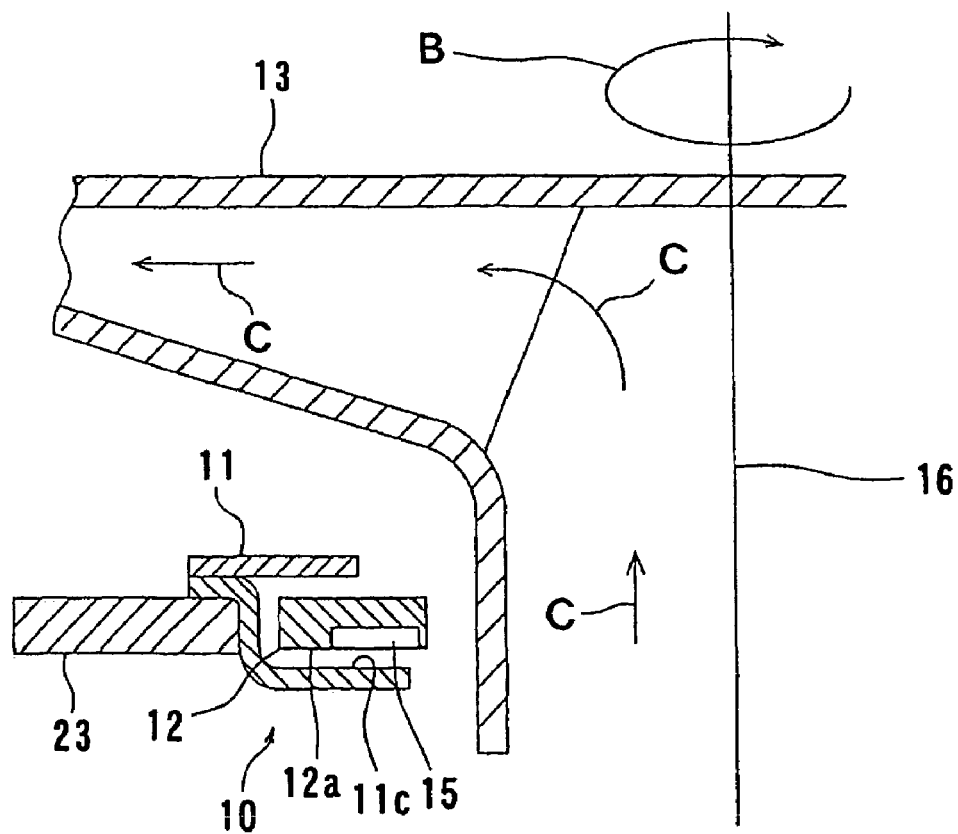
FIG. 6 is a cross-sectional view showing the seal mechanism shown in FIG. 5 together with an impeller of a centrifugal pump.

FIGS. 4 through 6 show an arrangement of a seal mechanism 10 according to a first embodiment of the present invention. FIG. 4 is a plan view of the seal mechanism 10, FIG. 5 is a cross-sectional view taken along line V-V of FIG. 4, and FIG. 6 is a cross-sectional view showing the seal mechanism 10 together with an impeller 13 of a centrifugal pump. As shown in FIG. 5, the seal mechanism 10 includes a housing (casing) 11 and an annular liner ring (seal member) 12 received in the housing 11.

The housing 11 includes an upper plate 11a disposed on a side of a high-pressure space H and a lower plate 11b disposed on a side of a low-pressure space L. The liner ring 12 has a lower flat surface 12a (first surface) on the side of the low-pressure space L. The lower flat surface 12a of the liner ring 12 faces an upper surface 11c (second surface) of the lower plate 11b of the housing 11. The liner ring 12 has passages 15 formed in the lower surface 12a.

The lower plate 11b of the housing 11 has an inside diameter $D_3$ larger than an outside diameter $D_4$ of the liner ring 12 ($D_3 > D_4$). Thus, the liner ring 12 is movable in a radial direction by a difference ($D_3 - D_4$) between the inside diameter $D_3$ of the lower plate 11b and the outside diameter $D_4$ of the liner ring 12.

As shown in FIG. 6, the seal mechanism 10 thus constructed is attached to a body 23 of a centrifugal pump so that the housing 11 of the seal mechanism 10 is fitted into an innermost portion of the body 23 near the impeller 13. The impeller 13 is rotatable about a center of an axis 16 as shown by arrow B. When the centrifugal pump is stopped, there is a clearance δ between the upper surface 11c of the lower plate 11b and the lower surface 12a of the liner ring 12. The clearance is filled with a handled liquid. When the centrifugal pump is operated, the handled liquid flows inside the impeller 13 as shown by arrows C. When the pressurized liquid presses the liner ring 12, a handled liquid present in the clearance between the liner ring 12 and the housing 11 flows through the passages 15 formed in the lower surface 12a of the liner ring 12 into the low-pressure space L. The liner ring 12 is brought into close contact with the upper surface 11c of the lower plate 11b.

Figure 7A:
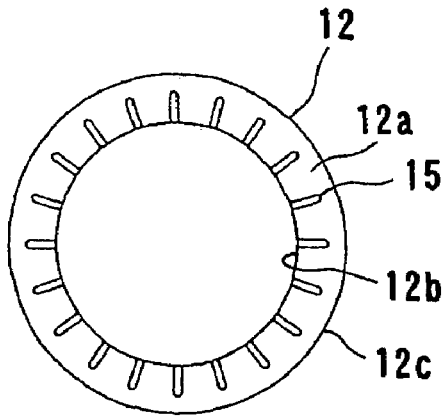
FIGS. 7A through 7F are bottom views showing examples of passages formed in a lower surface of a liner ring.
Figure 7B:
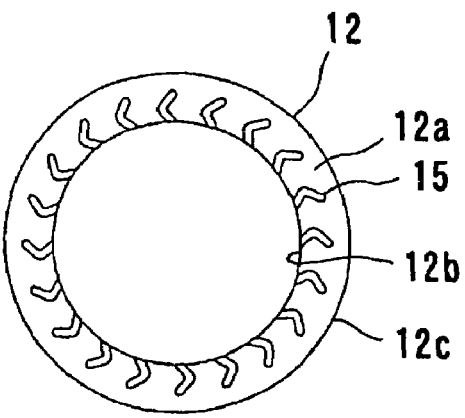
Figure 7C:
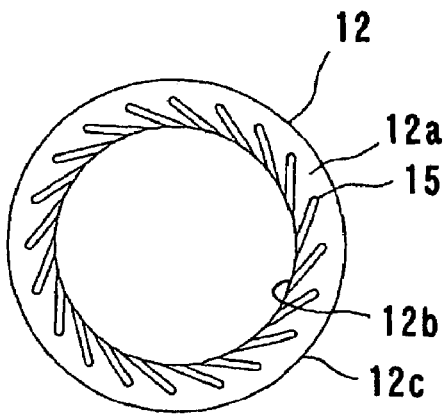

FIGS. 7A through 7F show examples of the passages 15 formed in the lower surface 12a of the liner ring 12. In each example shown in FIGS. 7A through 7F, the passages 15 extend radially outward from an inner circumferential surface 12b of the liner ring 12 on the low-pressure space L and do not reach an outer circumferential surface 12c of the liner ring 12. In FIG. 7A, the liner ring 12 has a plurality of linear short passages 15 arranged radially at equal intervals in a circumferential direction of the lower surface 12a of the liner ring 12. In FIG. 7B, the liner ring 12 has a plurality of V-shaped passages 15 arranged radially at equal intervals in a circumferential direction of the lower surface 12a of the liner ring 12. In FIG. 7C, the liner ring 12 has a plurality of linear short passages 15 formed at equal intervals spirally or in an inclined radial direction of the lower surface 12a of the liner ring 12.

Figure 7D:
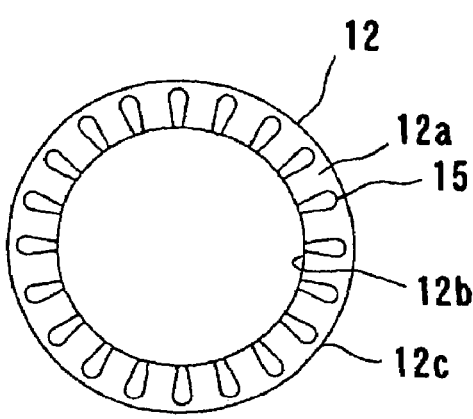
Figure 7E:
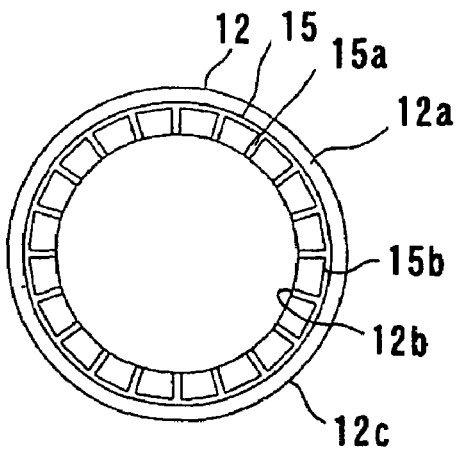
Figure 7F:
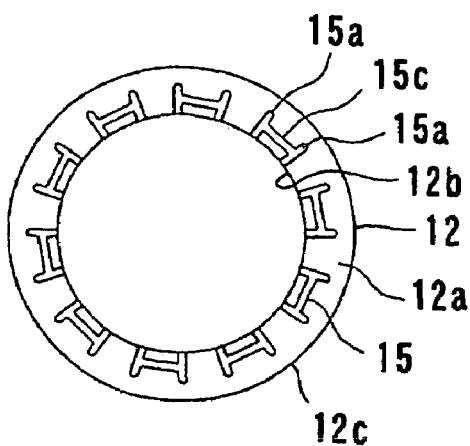

In FIG. 7D, the liner ring 12 has a plurality of passages 15 arranged at equal intervals in a circumferential direction of the lower surface 12a of the liner ring 12 in a manner such that the passages 15 are broadened toward the outer circumferential surface 12c of the liner ring 12. In FIG. 7E, the liner ring 12 has a plurality of linear short passages 15a arranged radially at equal intervals in a circumferential direction of the lower surface 12a of the liner ring 12, and an annular passage 15b extending in the circumferential direction so as to interconnect outer peripheral ends of the passages 15a. In FIG. 7F, the liner ring 12 has a plurality of H-shaped passages 15. The H-shaped passages 15 include a plurality of linear short passages 15a arranged radially at equal intervals in a circumferential direction of the lower surface 12a of the liner ring 12, and lateral passages 15c extending in the circumferential direction so as to interconnect two passages 15a and 15a.

Effects of formation of the passages 15 in the lower surface 12a of the liner ring 12 as shown in FIGS. 7A through 7F are as follows. When the centrifugal pump is stopped, there is a clearance δ between the upper surface 11c of the lower plate 11b and the lower surface 12a of the liner ring 12 (see FIG. 5).

The clearance is filled with a handled liquid. When the centrifugal pump is operated so that a pressurized liquid presses the liner ring 12, a handled liquid present in the clearance between the liner ring 12 and the housing 11 flows through the passages 15 formed in the lower surface 12a of the liner ring 12 into the low-pressure space L. Specifically, a negative pressure in the low-pressure space L is introduced into the passages 15 so that the liner ring 12 serves as a suction cup. Thus, the lower surface 12a of the liner ring 12 is brought into close contact with the upper surface 11c of the lower plate 11b of the housing 11. Thus, when the centrifugal pump is operated, the liner ring 12 is brought into close contact with the housing 11, so that the liner ring 12 does not play within the housing 11. Accordingly, it is possible to prevent noise from being generated.

Figure 8A:
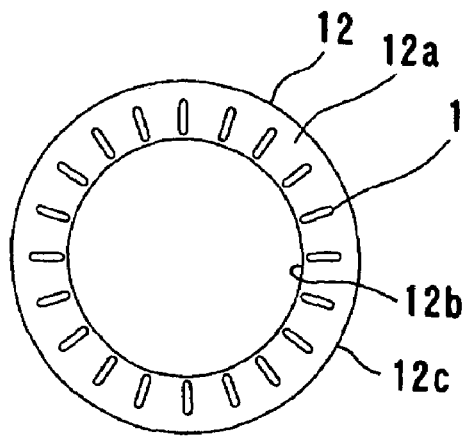
FIGS. 8A through 8F are bottom views showing examples of passages formed in a lower surface of a liner ring.
Figure 8B:
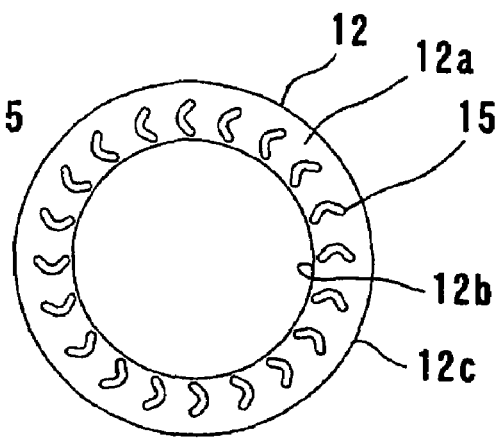
Figure 8C:
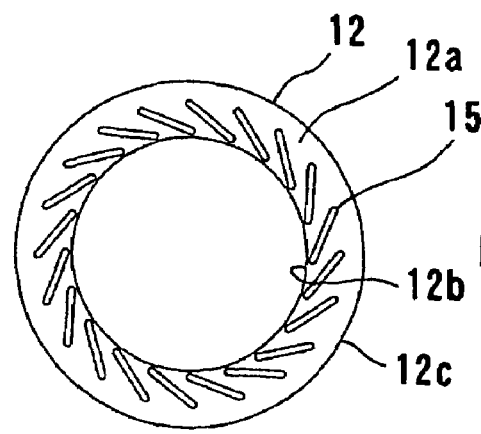

FIGS. 8A through 8F show other examples of the passages 15 formed in the lower surface 12a of the liner ring 12. In each example shown in FIGS. 8A through 8F, the passages 15 reach neither an inner circumferential surface 12b nor an outer circumferential surface 12c of the liner ring 12. In FIG. 8A, the liner ring 12 has a plurality of linear short passages 15 arranged radially at equal intervals in a circumferential direction of the lower surface 12a of the liner ring 12. In FIG. 8B, the liner ring 12 has a plurality of V-shaped passages 15 arranged radially at equal intervals in a circumferential direction of the lower surface 12a of the liner ring 12. In FIG. 8C, the liner ring 12 has a plurality of linear short passages 15 formed at equal intervals spirally or in an inclined radial direction of the lower surface 12a of the liner ring 12.

Figure 8D:
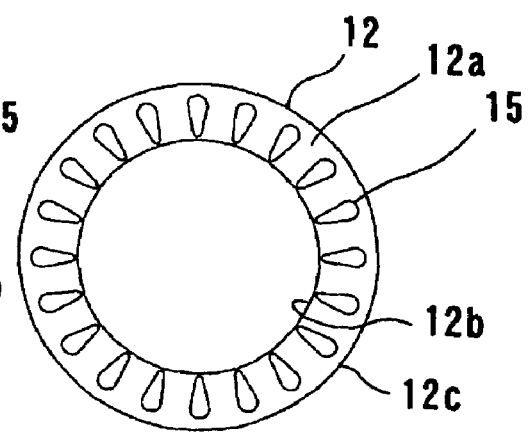
Figure 8E:
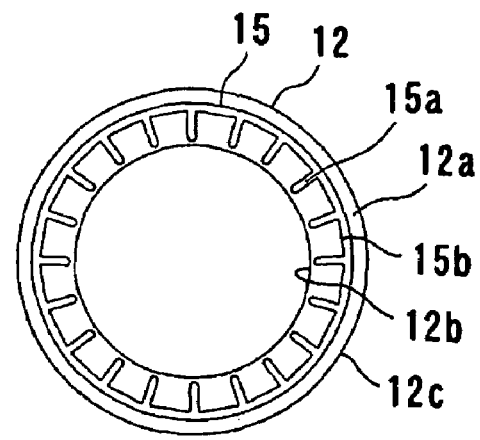
Figure 8F:
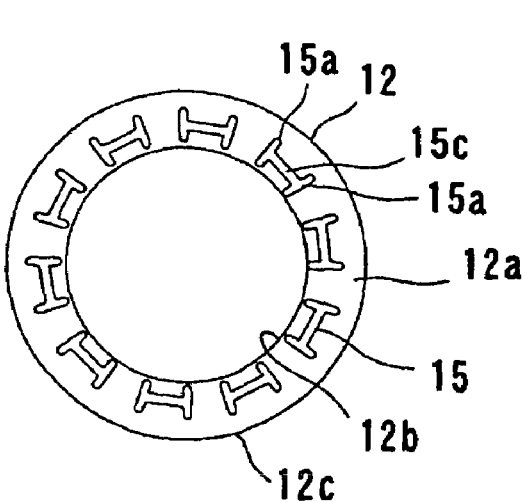

In FIG. 8D, the liner ring 12 has a plurality of passages 15 arranged at equal intervals in a circumferential direction of the lower surface 12a of the liner ring 12 in a manner such that the passages 15 are broadened toward the outer circumferential surface 12c of the liner ring 12. In FIG. 8E, the liner ring 12 has a plurality of linear short passages 15a arranged radially at equal intervals in a circumferential direction of the lower surface 12a of the liner ring 12, and an annular passage 15b extending in the circumferential direction so as to interconnect outer peripheral ends of the passages 15a. In FIG. 8F, the liner ring 12 has a plurality of H-shaped passages 15. The H-shaped passages 15 include a plurality of linear short passages 15a arranged radially at equal intervals in a circumferential direction of the lower surface 12a of the liner ring 12, and lateral passages 15c extending in the circumferential direction so as to interconnect two passages 15a and 15a.

According to the examples shown in FIGS. 8A through 8F, as in the case of the examples shown in FIGS. 7A through 7F, when the centrifugal pump is operated, the liner ring 12 is brought into close contact with the housing 11, so that the liner ring 12 does not play within the housing 11. Accordingly, it is possible to prevent noise from being generated.

Figure 9:
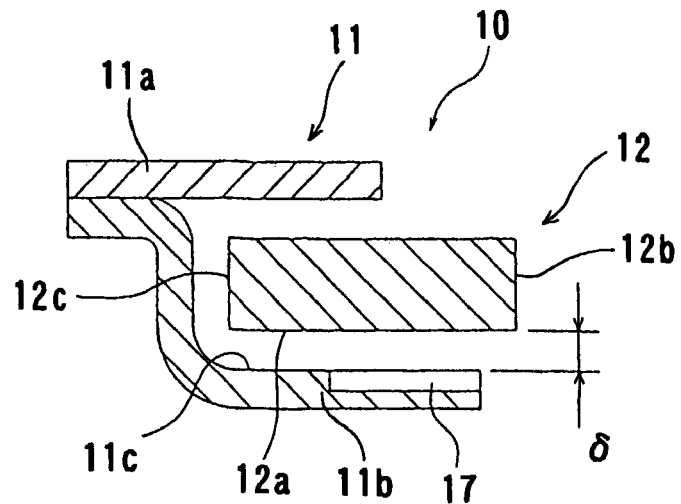
FIG. 9 is a cross-sectional view showing a seal mechanism according to a second embodiment of the present invention.

FIG. 9 shows a seal mechanism 10 according to a second embodiment of the present invention. In the first embodiment, the passages 15 are formed in the lower surface 12a of the liner ring 12. However, as shown in FIG. 9, passages 17 may be formed in the upper surface 11c of the lower plate 11b of the housing 11.

Effects of formation of the passages 17 in the upper surface 11c of the lower plate 11b as shown in FIG. 9 are as follows. When the centrifugal pump is stopped, there is a clearance δ between the upper surface 11c of the lower plate 11b of the housing 11 and the lower surface 12a of the liner ring 12. The clearance is filled with a handled liquid. When the centrifugal pump is operated, a negative pressure in the low-pressure space L is introduced into the passages 17 so that the liner ring 12 is attracted and adhered to the upper surface 11c of the lower plate 11b. As a result, it is possible to prevent noise from being generated. The passages 17 can be formed in the same manner as the passages 15 shown in FIGS. 7A through 8F.

The handled liquid pressurized by rotation of the impeller 13 applies forces via the liner ring 12 to the housing 11, which covers a major portion of the liner ring 12. Thus, a radially outward portion of the liner ring 12, which is brought into close contact with the upper surface 11c of the lower plate 11b, receives forces from the handled liquid together with the housing 11. Only a radially inward portion of the liner ring 12, which is not brought into contact with the upper surface 11c of the lower plate 11b, solely receives forces from the handled liquid. As a result, the apparent stiffness of the seal mechanism can be improved so that the liner ring 12 is not substantially deformed. Thus, it is possible to prevent noise from being generated due to deformation of the liner ring 12.

Figure 3:
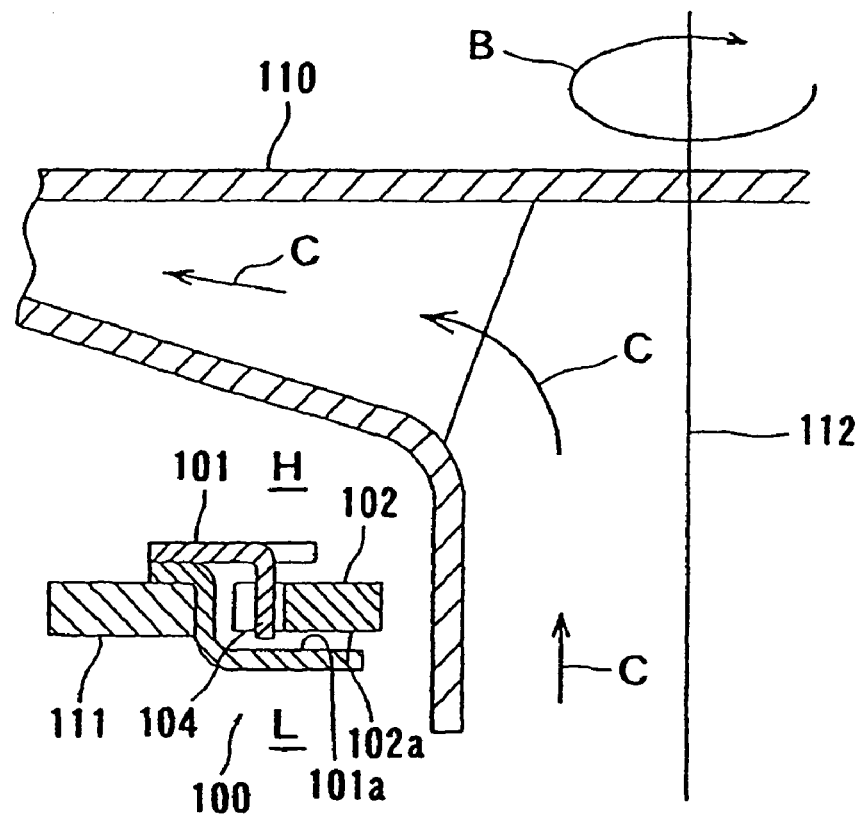
FIG. 3 is a cross-sectional view showing the conventional seal mechanism shown in FIG. 2 together with an impeller of a centrifugal pump.

Adhesion of the liner ring 12 to the housing 11 prevents the liner ring 2 from being rotated together with the impeller 13 due to sliding contact between the liner ring 12 and the impeller 13, the viscosity of the handled liquid present between the liner ring 2 and the impeller 13, and other possible factors. Accordingly, no stoppers such as the bent portions 104 shown in FIG. 3 are required for the liner ring 12. Thus, it is possible to prevent noise from being generated when the liner ring 12 hits the stoppers.

Figure 10:
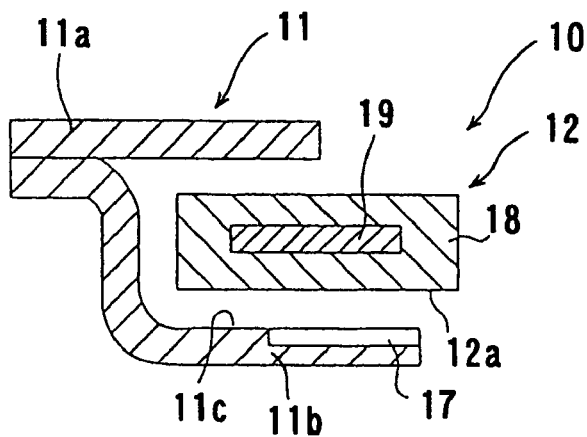
FIG. 10 is a cross-sectional view showing a seal mechanism according to a third embodiment of the present invention.

FIG. 10 shows a seal mechanism 10 according to a third embodiment of the present invention. As shown in FIG. 10, the seal mechanism 10 includes a liner ring 12 having a core 19 covered with synthetic resin 18. As with the second embodiment, passages 17 are formed in an upper surface 11c of a lower plate 11b of a housing 11. The passages 17 can be formed in the same manner as the passages 15 shown in FIGS. 7A through 8F. The housing 11 may include a core covered with synthetic resin, which is not shown. Further, the housing 11 and/or the liner ring 12 may be made of metal or synthetic resin. Further, at least one of the liner ring 12 and the housing 11 may be formed by molding. Molding can facilitate production of the liner ring 12 and the housing 11.

Figure 11:
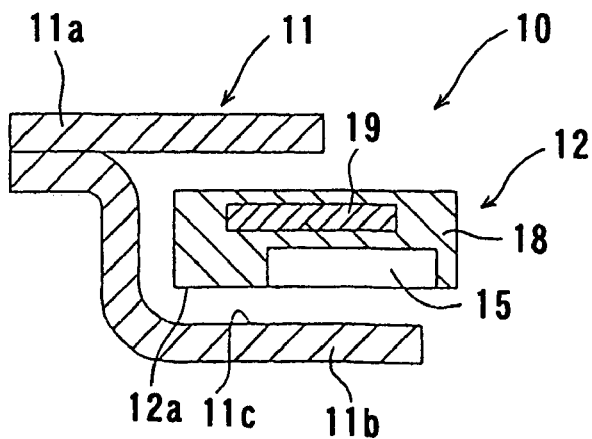
FIG. 11 is a cross-sectional view showing a seal mechanism according to a fourth embodiment of the present invention.

FIG. 11 shows a seal mechanism 10 according to a fourth embodiment of the present invention. As shown in FIG. 11, the seal mechanism 10 includes a liner ring 12 having a core 19 covered with synthetic resin 18. As with the first embodiment, passages 15 are formed in a lower surface 12a of the liner ring 12. The passages 15 can be formed in the same manner as the passages 15 shown in FIGS. 7A through 8F. The housing 11 may include a core covered with synthetic resin, which is not shown. Further, the housing 11 and/or the liner ring 12 may be made of metal or synthetic resin. Further, at least one of the liner ring 12 and the housing 11 may be formed by molding. Molding can facilitate production of the liner ring 12 and the housing 11.

The shapes of the passages formed in the lower surface 12a of the liner ring 12 or in the upper surface 11c of the lower plate 11b are not limited to the examples shown in FIGS. 7A through 8F. The liner ring 12 or the lower plate 11b of the housing 11 may have one or more passages having any shape as long as a negative pressure of the low-pressure space can be introduced into the passages so that the liner ring 12 is brought into close contact with the upper surface 11c of the lower plate 11b when the pump is operated.

Figure 12:
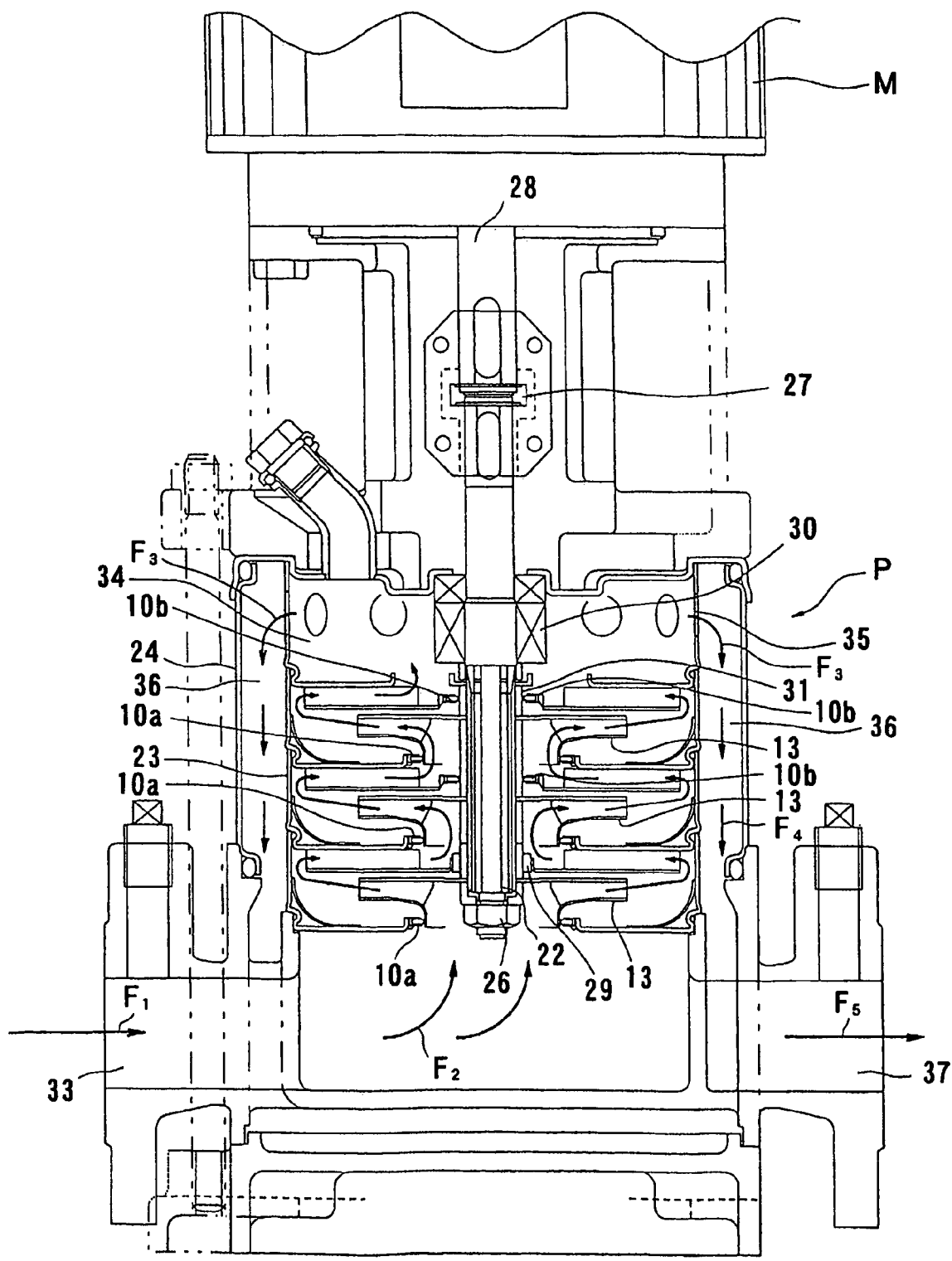
FIG. 12 is a cross-sectional view showing a first example of a centrifugal pump employing a seal mechanism according to the present invention.

Examples of a centrifugal pump having the aforementioned seal mechanism will be described with reference to FIGS. 12 and 13. FIG. 12 shows a first example of a centrifugal pump P employing a seal mechanism according to the present invention. As shown in FIG. 12, the centrifugal pump P has impellers 13 of three stages, a rotatable shaft 22, a body 23, a casing 24, a mechanical seal 30, and the like. The rotatable shaft 22 is rotatably supported in the body 23 by a coupling 27 and a plain bearing 29. The impellers 13 are fixed to the rotatable shaft 22 via a spline by fastening a nut 26 to the rotatable shaft 22. As shown in FIG. 12, sleeves 31 are provided around the rotatable shaft 22 between the impellers 13. The rotatable shaft 22 is coupled via the coupling 27 to an output shaft of a motor M. First seal mechanisms 10a are attached to the body 23 of the centrifugal pump P at locations closest to the impellers 13. Each of the first seal mechanisms 10a includes the housing 11 and the liner ring 12 as described above.

Further, second seal mechanisms 10b are attached to the body 23 of the centrifugal pump P at locations closest to the sleeves 31, which are disposed outside of the rotatable shaft 22. Each of the second seal mechanisms 10b includes the housing 11 as described above and a bush having the same shape as the liner ring 12 described above. When no sleeves are provided around the rotatable shaft 22, the second seal mechanisms 10b are attached to the body 23 at locations closest to the rotatable shaft 22.

With the centrifugal pump P thus constructed, when the motor M is driven to rotate the impellers 13, a handled liquid is drawn from a suction port 33 into the centrifugal pump P as shown by arrows $F_1$ and $F_2$. Then, the handled liquid flows through the first-stage impeller 13, the second-stage impeller 13, and the third-stage impeller 13 into an upper chamber 34 in the body 23. The handled liquid flows out of the upper chamber 34 into a passage 36 formed between an outer circumferential surface of the body 23 and an inner circumferential surface of the casing 24 as shown by arrows $F_3$ and $F_4$. Thus, the handled liquid flows through the passage 36. Then, the handled liquid is discharged from a discharge port 37 as shown by arrow $F_5$.

As described above, each of the first seal mechanisms 10a attached to the body 23 at locations closest to the first-stage, second-stage, and third-stage impellers 13 has one or more passages formed in the lower surface 12a of the liner ring 12 or in the upper surface 11c of the lower plate 11b of the housing 11. When the centrifugal pump P is operated, the liner ring 12 is brought into close contact with the upper surface 11c of the lower plate 11b of the housing 11. Accordingly, the liner ring 12 does not play within the housing 11. Thus, it is possible to prevent noise from being generated. Further, since the liner ring 12 is brought into close contact with the housing 11, the liner ring 12 is not substantially deformed. Accordingly, it is possible to prevent noise from being generated due to deformation of the liner ring 12. Furthermore, since the second seal mechanisms 10b according to the present invention are attached to the body 23 at locations closest to the sleeves 31, it is possible to prevent noise from being generated due to play of the bush within the housing 11 or deformation of the bush.

Figure 13:
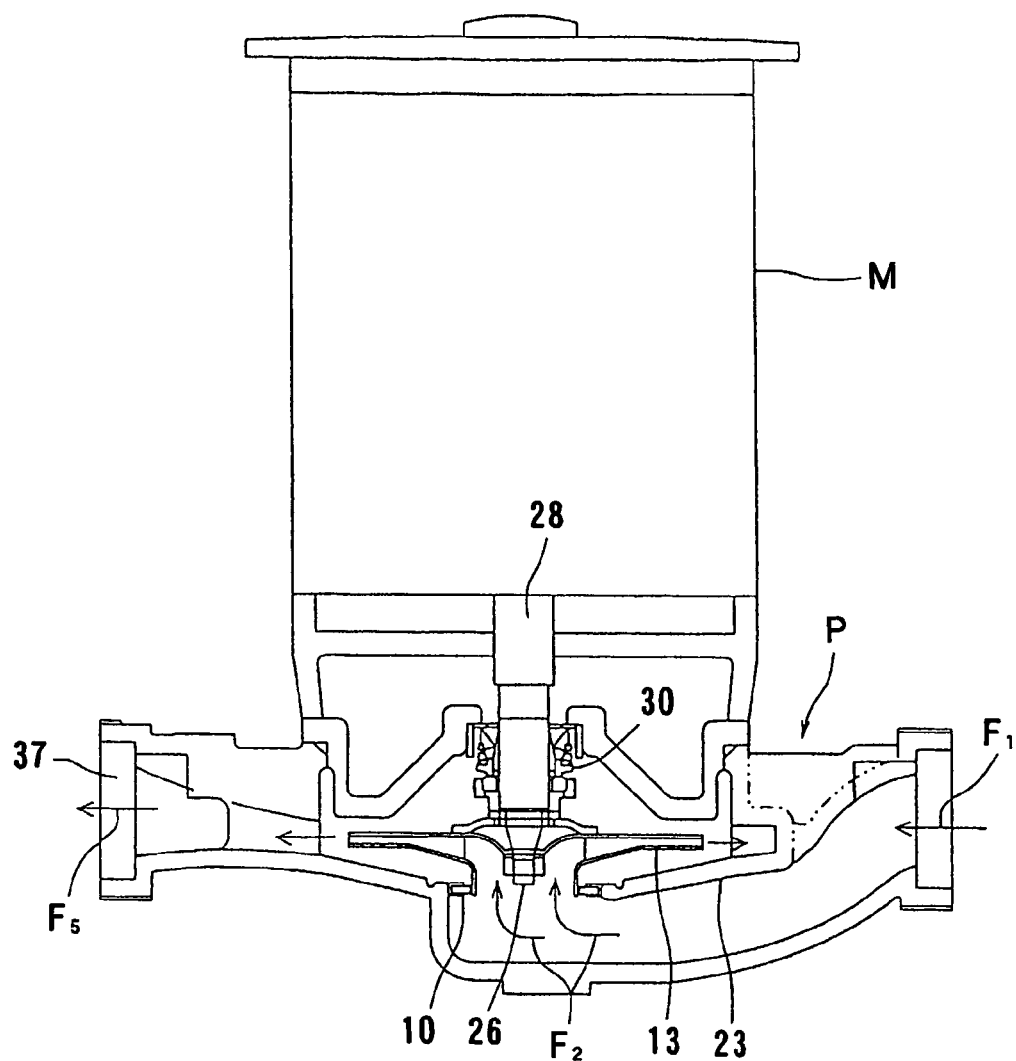
FIG. 13 is a cross-sectional view showing a second example of a centrifugal pump employing a seal mechanism according to the present invention.

FIG. 13 shows a second example of a centrifugal pump P employing a seal mechanism according to the present invention. As shown in FIG. 13, the centrifugal pump P has an impeller 13 of a single stage. The impeller 13 is coupled to an output shaft 28 of a motor M. The centrifugal pump P includes a mechanical seal 30 provided at a portion through which the output shaft 28 of the motor M penetrates the body 23 of the centrifugal pump P. A seal mechanism 10 according to the present invention is attached to the body 23 of the centrifugal pump P at a location closest to the impeller 13.

As described above, the seal mechanism 10 has one or more passages formed in the lower surface 12a of the liner ring 12 or in the upper surface 11c of the lower plate 11b of the housing 11. When the centrifugal pump P is operated, the liner ring 12 is brought into close contact with the upper surface 11c of the lower plate 11b of the housing 11. Accordingly, the liner ring 12 does not play within the housing 11. Thus, it is possible to prevent noise from being generated. Further, since the liner ring 12 is brought into close contact with the housing 11, the liner ring 12 is not substantially deformed. Accordingly, it is possible to prevent noise from being generated due to deformation of the liner ring 12.

Figure 14:
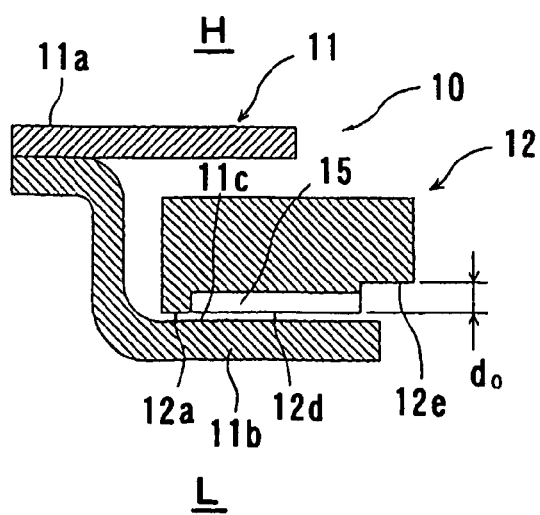
FIG. 14 is a cross-sectional view showing a seal mechanism according to a fifth embodiment of the present invention.

FIG. 14 shows a seal mechanism 10 according to a fifth embodiment of the present invention. FIG. 14 corresponds to a cross-sectional view taken along line V-V of FIG. 4. As shown in FIG. 14, the seal mechanism 10 includes a liner ring 12 as a seal member received in a housing 11. The liner ring 12 has a lower surface 12a facing an upper surface 11c of a lower plate 11b of the housing 11. In the present embodiment, the lower surface 12a of the liner ring 12 includes a radially outward surface 12d which is brought into contact with the upper surface 11c of the lower plate 11b, and a radially inward surface 12e located radially inward of the radially outward surface 12d. The radially outward surface 12d is projected from the radially inward surface 12e toward the low-pressure space L by a predetermined distance $d_0$.

For example, when a centrifugal pump P as shown in FIG. 12 or 13 is operated, a high-pressure fluid pressurized by the impeller 13 presses the liner ring (seal member) 12 against the upper surface 11c of the lower plate 11b. At that time; only the radially outward surface 12d of the liner ring 12, which projects from the radially inward surface 12e by the predetermined distance $d_0$, is brought into contact with the upper surface 11c of the lower plate 11b. The radially inward surface 12e, which is located radially inward of the radially outward surface 12d, is not brought into contact with the upper surface 11c of the lower plate 11b.

Figure 15:
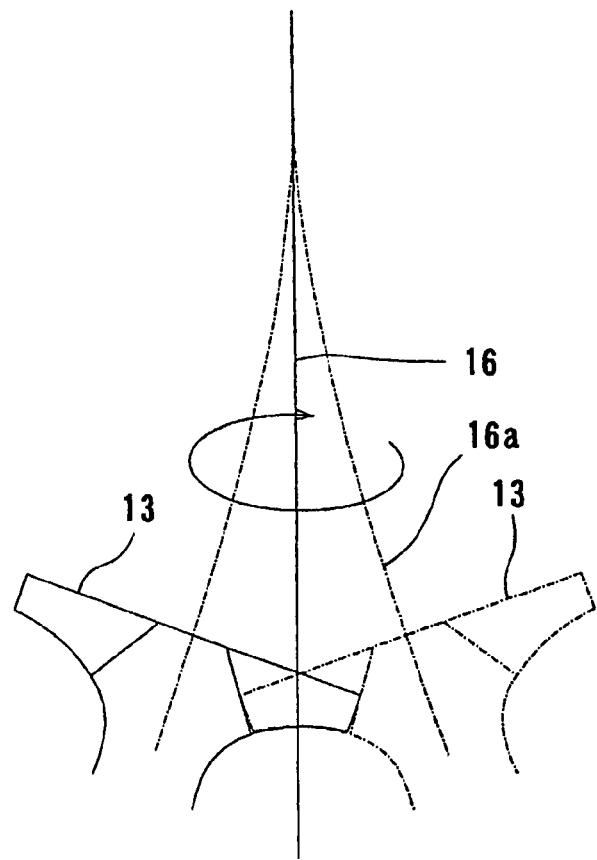
FIG. 15 is a schematic view showing whirling in a centrifugal pump.
Figure 16:
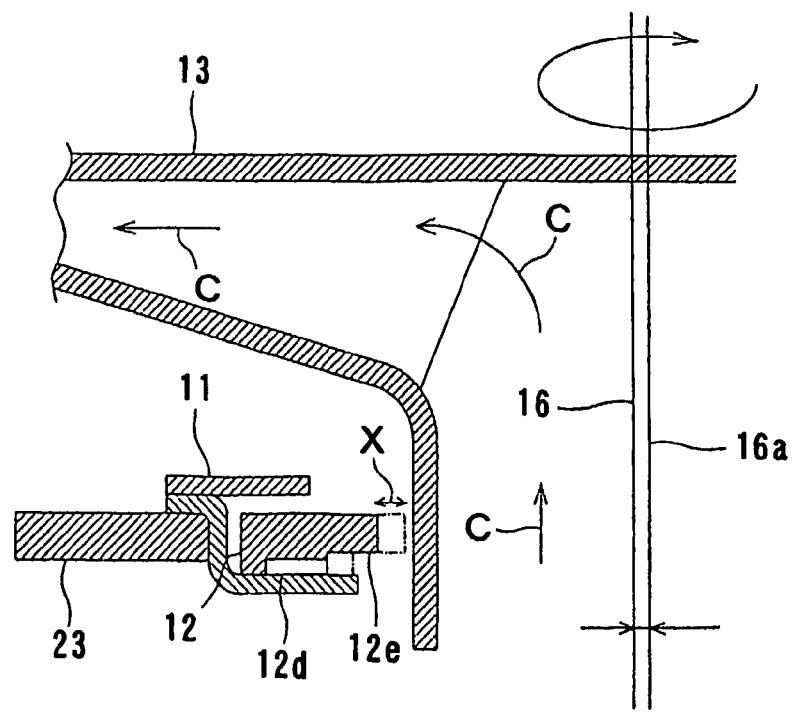
FIG. 16 is a cross-sectional view showing the seal mechanism shown in FIG. 14 together with an impeller of a centrifugal pump.
Figure 17:
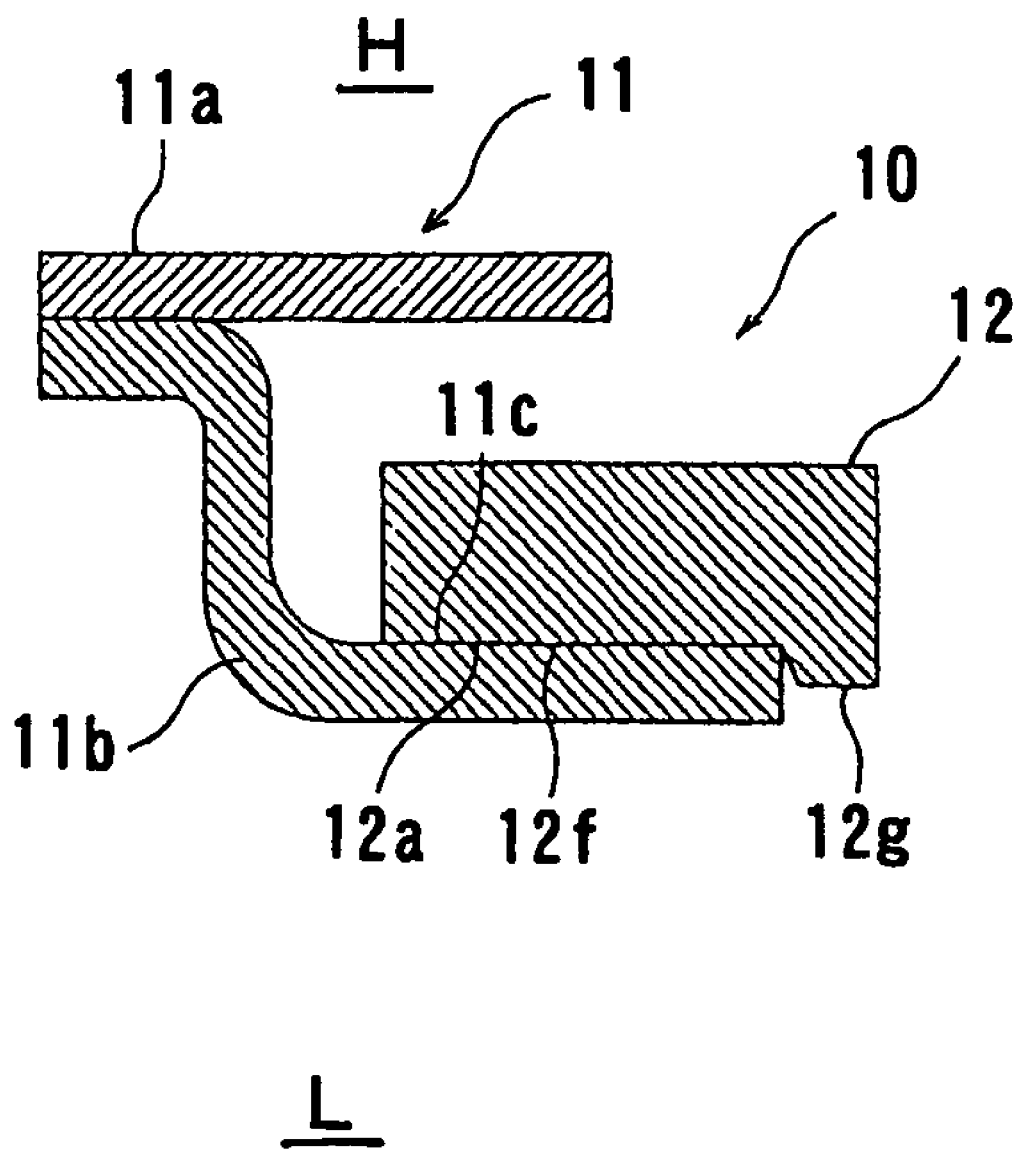
FIG. 17 is a cross-sectional view showing a worn state of a seal mechanism including a liner ring having a flat lower surface and a housing.

In the centrifugal pump as shown in FIG. 12 or 13, unbalance of an impeller or insufficient accuracy of rotatable components including a main shaft may cause whirling of the impeller 13. Specifically, as shown in FIG. 15, the impeller 13 is rotated about an axis 16a spaced from a center 16 of the main shaft. The whirling of the impeller 13 is transmitted to the liner ring 12 of the seal mechanism 10, so that the liner ring 12 is moved within a range X shown in FIG. 16. If the lower surface 12a of the liner ring 12, which faces the upper surface 11c of the lower plate 11b of the housing 11, is flat over its entire surface, then the lower surface 12a has an area that contacts the upper surface 11c of the lower plate 11b and an area that does not contact the upper surface 11c of the lower plate 11b. As a result, as shown in FIG. 17, only the area 12f of the lower surface 12a that is brought into contact with the upper surface 11c of the lower plate 11b is worn away to thereby form a step between the area 12f and the area 12g that is not brought into contact with the upper surface 11c of the lower plate 11b. Such a step formed on the lower surface 12a of the liner ring 12 restricts movement of the liner ring (seal ring) 12. Accordingly, noise is generated.

In the present embodiment, as shown in FIG. 14, the lower surface 12a of the liner ring 12 includes the radially outward surface 12d which contacts the upper surface 11c of the lower plate 11b over its entire surface, and the radially inward surface 12e located radially inward of the radially outward surface 12d. The radially outward surface 12d projects from the radially inward surface 12e toward the low-pressure space L by the predetermined distance $d_0$. Accordingly, when the centrifugal pump is operated, only the radially outward surface (projection) 12d is continuously brought into contact with the upper surface 11c of the lower plate 11b and thus worn away. As a result, the radially inward surface 12e does not project from the radially outward surface 12d toward the low-pressure space L unless the radially outward surface 12d becomes in the same plane as the radially inward surface 12e due to abrasion of the radially outward surface 12d. Accordingly, the movement of the liner ring 12 is not restricted by the housing 11, and it is possible to prevent noise from being generated.

In the above examples, a seal mechanism according to the present invention is used in a centrifugal pump. However, a seal mechanism according to the present invention is applicable to any fluid machine as long as the fluid machine has a body, a rotatable member disposed within the body, and a seal mechanism provided between the body and the rotatable member for preventing a fluid from leaking out of a high-pressure space into a low-pressure space in the fluid machine.

The term "below", "above", "bottom", "upper", and "lower" and other positional terms used herein are shown with respect to the embodiments in the figures and may be varied depending on the relative orientation of the sealing mechanism or the centrifugal pump.

Although certain preferred embodiments of the present invention have been shown and described in detail, it should be understood that various changes and modifications may be made therein without departing from the scope of the appended claims.

INDUSTRIAL APPLICABILITY

The present invention is suitable for use in a seal mechanism for preventing a fluid from leaking out of a high-pressure space into a low-pressure space between a body and a rotatable member of a fluid machine.

The invention claimed is:

1. A seal mechanism for a fluid machine for preventing a fluid from leaking out of a high-pressure space into a low-pressure space in the fluid machine, said seal mechanism comprising:
    an annular seal member movable in a radial direction, said annular seal member having a first surface on a side of the low-pressure space in the fluid machine;
    a housing disposed between a body of the fluid machine and a rotatable member located inside the body of the fluid machine so as to receive said annular seal member, said housing having a second surface facing said first surface of said annular seal member; and
    at least one passage formed in at least one of said first surface and said second surface such that a negative pressure of the low-pressure space is introduced into said at least one passage to bring said annular seal member into close contact with said second surface of said housing.

2. The seal mechanism as recited in claim 1, wherein said at least one of said first surface and said second surface comprises a flat surface.

3. The seal mechanism as recited in claim 1, wherein said at least one passage comprises a plurality of passages that do not reach an outer circumferential surface of said annular seal member.

4. The seal mechanism as recited in claim 3, wherein said plurality of passages do not reach an inner circumferential surface of said annular seal member.

5. The seal mechanism as recited in claim 3, wherein said plurality of passages include radially arranged passages.

6. The seal mechanism as recited in claim 3, wherein said plurality of passages include a passage extending in a circumferential direction.

7. The seal mechanism as recited in claim 1, wherein at least one of said housing and said seal member is made of metal or synthetic resin.

8. The seal mechanism as recited in claim 1, wherein at least one of said housing and said seal member includes a core covered with synthetic resin.

9. The seal mechanism as recited in claim 1, wherein at least one of said housing and said seal member is formed by molding.

10. A seal mechanism for a fluid machine for preventing a fluid from leaking out of a high-pressure space into a low-pressure space in the fluid machine, said seal mechanism comprising:
    an annular seal member movable in a radial direction, said annular seal member having at least two first surfaces on a side of the low-pressure space in the fluid machine;
    a housing disposed between a body of the fluid machine and a rotatable member located inside the body of the fluid machine so as to receive said annular seal member, said housing having a second surface facing said at least two first surfaces of said annular seal member; and
    at least one passage formed in at least one of said at least two first surfaces and said second surface such that a negative pressure of the low-pressure space is introduced into said at least one passage to bring said annular seal member into close contact with said second surface of said housing,
    wherein said at least two first surfaces of said annular seal member include:
        a radially outward surface which is brought into contact with said second surface of said housing over its entire surface; and
        a radially inward surface located radially inward of said radially outward surface, said radially outward surface projecting from said radially inward surface toward the low-pressure space in the fluid machine.

11. A centrifugal pump comprising:
    a body;
    a rotatable shaft;
    an impeller rotatable about said rotatable shaft within said body; and
    said seal mechanism as recited in claim 1, said seal mechanism being disposed between said body and said impeller.

12. A centrifugal pump comprising:
    a body;
    a rotatable shaft;
    an impeller rotatable about said rotatable shaft within the said body; and
    said seal mechanism as recited in claim 1, said seal mechanism being disposed between said body and said rotatable shaft.

13. A fluid machine comprising:
    a body;
    a rotatable member disposed within said body; and
    said seal mechanism as recited in claim 1, said seal mechanism being disposed between said body and said rotatable member.

14. A centrifugal pump comprising:
    a body;
    a rotatable shaft;
    an impeller rotatable about said rotatable shaft within said body; and
    said seal mechanism as recited in claim 10, said seal mechanism being disposed between said body and said impeller.

15. A centrifugal pump comprising:
    a body;
    a rotatable shaft;
    an impeller rotatable about said rotatable shaft within said body; and
    said seal mechanism as recited in claim 10, said seal mechanism being disposed between said body and said rotatable shaft.

16. A fluid machine comprising:
    a body;
    a rotatable member disposed within said body; and
    said seal mechanism as recited in claim 10, said seal mechanism being disposed between said body and said rotatable member.

17. The seal mechanism as recited in claim 4, wherein said plurality of passages include radially arranged passages.

18. The seal mechanism as recited in claim 4, wherein said plurality of passages include a passage extending in a circumferential direction.

19. The seal mechanism as recited in claim 2, wherein at least one of said housing and said seal member is made of metal or synthetic resin.

20. The seal mechanism as recited in claim 3, wherein at least one of said housing and said seal member is made of metal or synthetic resin.

* * * * *